US011356875B2

(12) United States Patent
Glover

(10) Patent No.: US 11,356,875 B2
(45) Date of Patent: Jun. 7, 2022

(54) TEST SYSTEM AND TESTING METHOD

(71) Applicant: Rohde & Schwarz GmbH & Co. KG, Munich (DE)

(72) Inventor: Brian Glover, Fleet (GB)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/036,306

(22) Filed: Sep. 29, 2020

(65) Prior Publication Data

US 2022/0104041 A1    Mar. 31, 2022

(51) Int. Cl.
*H04B 7/00* (2006.01)
*H04W 24/08* (2009.01)
*H04W 4/80* (2018.01)

(52) U.S. Cl.
CPC ............. *H04W 24/08* (2013.01); *H04W 4/80* (2018.02)

(58) Field of Classification Search
CPC ................................. H04W 24/08; H04W 4/80
USPC ......................................................... 455/41.2
See application file for complete search history.

(56) References Cited

U.S. PATENT DOCUMENTS

| 8,693,351 | B2* | 4/2014 | Olgaard | H04W 24/06 370/242 |
|---|---|---|---|---|
| 9,883,412 | B2* | 1/2018 | Chandra | H04W 24/06 |
| 10,296,433 | B2* | 5/2019 | Olgaard | G06F 11/2733 |
| 10,397,765 | B2* | 8/2019 | Rowell | H04W 4/02 |
| 10,637,589 | B1* | 4/2020 | Chakraborty | H04B 17/318 |
| 10,999,723 | B2* | 5/2021 | Barthel | G08B 5/36 |
| 2013/0028100 | A1* | 1/2013 | Olgaard | H04L 1/24 370/242 |

* cited by examiner

*Primary Examiner* — April G Gonzales
(74) *Attorney, Agent, or Firm* — Christensen O'Connor Johnson Kindness PLLC

(57) ABSTRACT

A test system for testing a device under test is described. The test system includes a testing module and the device under test. The testing module is configured to establish a wireless connection with the device under test based on a wireless communication standard having a low energy protocol. The wireless connection includes a control channel and at least one test channel. The control channel is configured to transmit at least one control message between the testing module and the device under test. The at least one test channel is configured to transmit data packages between the testing module and the device under test, wherein an RF level of the control channel is higher than an RF level of the at least one test channel. Further, a testing method for testing a device under test is described.

17 Claims, 3 Drawing Sheets

TEST SYSTEM AND TESTING METHOD

FIELD OF THE DISCLOSURE

Embodiments of the present disclosure generally relate to a test system for testing a device under test. Embodiments of the present disclosure further relate to a testing method for testing a device under test.

BACKGROUND

Many different kinds of electronic devices employ low energy wireless connections in order to communicate with other electronic devices within a nearfield distance.

Usually, the low energy communication properties of such electronic devices are tested with regard to their radio frequency performance while using a physical connection to control the respective electronic device.

However, establishing the physical connection to control the electronic device is time consuming since cables have to be connected to the respective device. Further, the control cables used may restrict the testing quality as well as the testing area in case of short cables. In fact, certain types of electronic devices do not even have a port for establishing a physical connection, and thus have to be tested over the air.

When testing at very low signal levels, a wireless connection between a test instrument and the electronic device under test may be lost, such that the respective test cannot be performed correctly.

Accordingly, there is a need for a test system and a testing method that provide the possibility to test low energy communication properties of electronic devices at low signal levels.

SUMMARY

Embodiments of the present disclosure provide a test system for testing a device under test. In an embodiment, the test system comprises a testing module and the device under test. The testing module, composed of, inter alia, one or more circuits, is configured to establish a wireless connection with the device under test based on a wireless communication standard having a low energy protocol. The wireless connection comprises a control channel and at least one test channel. The control channel is configured to transmit at least one control message between the testing module and the device under test. The at least one test channel is configured to transmit data packages between the testing module and the device under test, wherein an RF level of the control channel is higher than an RF level of the at least one test channel.

In general, the at least one control message comprises information being relevant for establishing a communication between the testing module and the device under test and/or for controlling the device under test to enter a certain operational mode.

Thus, the control channel is used for establishing the communication between the testing module and the device under test and/or for controlling the device under test.

The data packages are associated with information that is transmitted between the testing module and the device under test. Thus, the at least one test channel is used for transmitting data other than the at least one control message between the testing module and the device under test. In some embodiments, the at least one test channel corresponds to at least one communication channel that is used by the device under test for communicating with other electronic devices.

The test system according to the present disclosure is based on the finding that a low energy wireless connection between the testing module and the device under test is maintained even for low RF levels of the at least one test channel if the RF level of the control channel is kept higher than the RF level of the test channel.

This way, the device under test can be tested via the at least one test channel at low signal levels without losing the connection between the device under test and the testing module. Accordingly, properties of the device under test can be tested at low signal levels in a reliable manner, and without a need for a physical connection between the testing module and the device under test.

For example, a sensitivity level of the device under test can be determined without the need for a physical connection between the device under test and the testing module. The sensitivity level is associated with a minimal signal level needed for a reliable data transmission between the device under test and another electronic device.

According to an aspect of the present disclosure, the wireless communication standard is associated with Bluetooth Low Energy. Accordingly, the at least one test channel may be established as a data channel of the Bluetooth Low Energy protocol. The control channel may be established as one of the three advertising channels of the Bluetooth Low Energy protocol.

It is noted that in the context of Bluetooth Low Energy, the terms "equipment under test" and "instrument under test" are also common to denote the device under test. In the present disclosure, the terms "device under test", "equipment under test" and "instrument under test" are used as synonyms.

Bluetooth Low Energy is also known as "Bluetooth Smart".

According to another aspect of the present disclosure, the testing module is configured to selectively adjust the RF level of the control channel and the RF level of the at least one test channel. In other words, the testing module may vary the signal level of the at least one control message sent via the control channel and/or the signal level of the data packages transmitted via the at least one test channel.

In some embodiments, the testing module is configured to keep an RF level difference between the control channel and the at least one test channel constant. In other words, the testing module may vary the RF levels of the control channel and of the at least one data channel simultaneously in such a way that the RF level difference is kept constant. Thus, a constant RF level difference between the control channel and the at least one test channel is maintained.

According to a further embodiment of the present disclosure, the testing module is configured to adjust an RF level difference between the control channel and the at least one test channel. In other words, the testing module may vary the RF levels of the control channel and of the at least one data channel individually, i.e. independent from one another.

For example, the testing module may be configured to keep the RF level of the control channel constant, and to adjust the RF level of the at least one data channel only. In some embodiments, the testing module may be configured to lower the RF level of the at least one test channel, while maintaining the RF level of the control channel.

According to another aspect of the present disclosure, the testing module is configured to conduct a packet error rate (PER) test on the device under test via the wireless connection. In general, the PER corresponds to the number of data packages that are not successfully received by the device under test divided by the total number of data packages sent to the device under test. Thus, the PER constitutes a measure for the reliability of the wireless connection between the testing module and the device under test at a particular RF level.

In some embodiments, the testing module is configured to conduct the PER test via the at least one test channel. In other words, the reliability of the transmission of data packages via the at least one test channel is tested by the testing module for at least one particular RF level of the at least one test channel.

The testing module may be configured to conduct the PER test for a receiver mode of the device under test. Accordingly, the testing module may be configured to generate an output signal comprising the data packages and transmit the output signal to the device under test via the at least one test channel. The device under test may receive the data packages and count the correctly received data packages. The device under test may feed back the number of successfully received data packages to the testing module via the at least one test channel or via the control channel.

Of course, the device under test may also count the incorrectly received data packages. However, counting the number of correctly received data packages and the number of incorrectly received data packages is equivalent, as these numbers add up to the total number of sent data packages.

In some embodiments, the PER test comprises an error threshold being associated with a maximal allowable PER of the device under test. The maximal allowable PER constitutes a decision criterion for whether the PER test is passed by the device under test or not. More precisely, the PER test is passed if the PER is smaller than the maximal allowable PER. Conversely, the PER test is failed if the PER is bigger than the maximum allowable PER. Stated differently, the device under test has to fulfill a certain PER requirement in order to pass the PER test.

The maximal allowable PER may be dependent on a payload length of the data packages, i.e. on a number of symbols comprised in each data package, for example dependent on a number of bits comprised in each data package. In other words, the device under test may have to fulfill a certain PER requirement depending on the number of symbols (e.g. bits) contained in each data package.

According to an embodiment of the present, the testing module is configured to conduct the PER test at several different RF levels of the at least one test channel. Thus, a PER may be conducted by the testing module at a first RF level of the test channel. After the PER test is completed, the RF level of at least the test channel may be adapted to a second RF level, for example wherein the second RF level is lower than the first RF level. Then, a PER test may be conducted by the testing module at the second RF level of the test channel.

Of course, further PER tests may be conducted at further RF levels being different from both the first RF level and the second RF level.

For example, the RF level of the at least one test channel may be lowered until the device under test fails the PR test, thereby obtaining the sensitivity level of the device under test. More precisely, the sensitivity level of the device under test may be determined to be equal to the lowest RF level of the at least one test channel for which the device under test has passed the PER test.

The RF level of the control channel may also be adapted between the individual PER tests. In some embodiments, the RF level of the control channel may be lowered between the individual PER tests.

Alternatively, the RF level of the control channel may be kept constant between the individual PER tests.

In a further embodiment of the present disclosure, the testing module is configured to conduct the PER test on several different test channels simultaneously or consecutively. Accordingly, the reliability of the transmission of the data packets transmission on several of the test channels is tested simultaneously or consecutively. For example, a sensitivity level of several of the test channels, for example of all test channels, may be determined.

Embodiments of the present disclosure further provide a test method for testing a device under test. In an embodiment, the test method comprises the following steps:

establishing a wireless connection with the device under test based on a wireless communication standard having a low energy protocol by a testing module, wherein the wireless connection comprises a control channel and a test channel;

transmitting a control message via the control channel; and transmitting data packages via the test channel;

wherein an RF level of the control channel is higher than an RF level of the at least one test channel.

In some embodiments, the test system described above is configured to perform the test method.

Regarding the advantages and further properties of the test method, reference is made to the explanations given above with respect to the test system, which also hold for the test method and vice versa.

According to an embodiment of the present disclosure, the wireless communication standard is associated with Bluetooth Low Energy. Accordingly, the at least one test channel may be established as a data channel of the Bluetooth Low Energy protocol. The control channel may be established as one of the three advertising channels of the Bluetooth Low Energy protocol.

According to another embodiment of the present disclosure, the RF level of the control channel and the RF level of the at least one test channel are selectively adjusted. In other words, the signal level of the at least one control message sent via the control channel and/or the signal level of the data packages transmitted via the at least one test channel may be selectively varied.

An RF level difference between the control channel and the at least one test channel may be kept constant. In other words, the RF levels of the control channel and of the at least one data channel may be varied simultaneously in such a way that the RF level difference is kept constant. Thus, a constant RF level difference between the control channel and the at least one test channel is maintained.

According to an aspect of the present disclosure, an RF level difference between the control channel and the at least one test channel is adjusted. In other words, the RF levels of the control channel and of the at least one data channel may be varied individually, i.e. independent from one another.

In some embodiments, a packet error rate (PER) test is conducted on the device under test by the testing module via the wireless connection. In general, the PER corresponds to the number of data packages that are not successfully received by the device under test divided by the total number of data packages sent to the device under test. Thus, the PER constitutes a measure for the reliability of the wireless connection between the testing module and the device under test.

In particular, the PER test is conducted via the at least one test channel. In other words, the reliability of the transmission of data packages via the at least one test channel is tested for at least one particular RF level of the at least one test channel.

According to another aspect of the present disclosure, the PER test is conducted for a receiver mode of the device under test. Accordingly, an output signal comprising the data packages may be generated and transmitted to the device under test via the at least one test channel. The device under test may receive the data packages and count the correctly received data packages. The device under test may then feed back the number of successfully received data packages via the at least one test channel or via the control channel.

Of course, the device under test may also count the incorrectly received data packages. However, counting the number of correctly received data packages and the number of incorrectly received data packages is equivalent, as these numbers add up to the total number of sent data packages.

In a further embodiment of the present disclosure, the PER test comprises an error threshold being associated with a maximal allowable PER of the device under test. The maximal allowable PER constitutes a decision criterion for whether the PER test is passed by the device under test or not. More precisely, the PER test is passed if the PER rate is smaller than the maximal allowable PER. Conversely, the PER test is failed if the PER is bigger than the maximum allowable PER. Stated differently, the device under test to fulfill a certain PER requirement in order to pass the PER test.

The maximal allowable PER may be dependent on a payload length of the data packages, i.e. on the number of symbols comprised in each data package, for example dependent on the number of bits comprised in each data package. In other words, the device under test may have to fulfill a certain PER requirement depending on the number of symbols (e.g. bits) contained in each data package.

The PER test may be conducted at several different RF levels of the at least one test channel. Thus, a PER may be conducted at a first RF level of the test channel. After the PER test is completed, the RF level may be adapted to a second RF level, for example wherein the second RF level is lower than the first RF level. Then, a PER test may be conducted at the second RF level of the test channel.

Of course, further PER tests may be conducted at further RF levels being different from both the first RF level and the second RF level.

For example, the RF level of the at least one test channel may be lowered until the device under test fails the PR test, thereby obtaining the sensitivity level of the device under test. More precisely, the sensitivity level of the device under test may be determined to be equal to the lowest RF level of the at least one test channel for which the device under test has passed the PER test.

In some embodiments, the PER test is conducted on several different test channels simultaneously or consecutively. Accordingly, the reliability of the transmission of the data packets transmission is tested on several of the test channels simultaneously or consecutively. For example, a sensitivity level of several of the test channels, for example of all test channels, may be determined.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
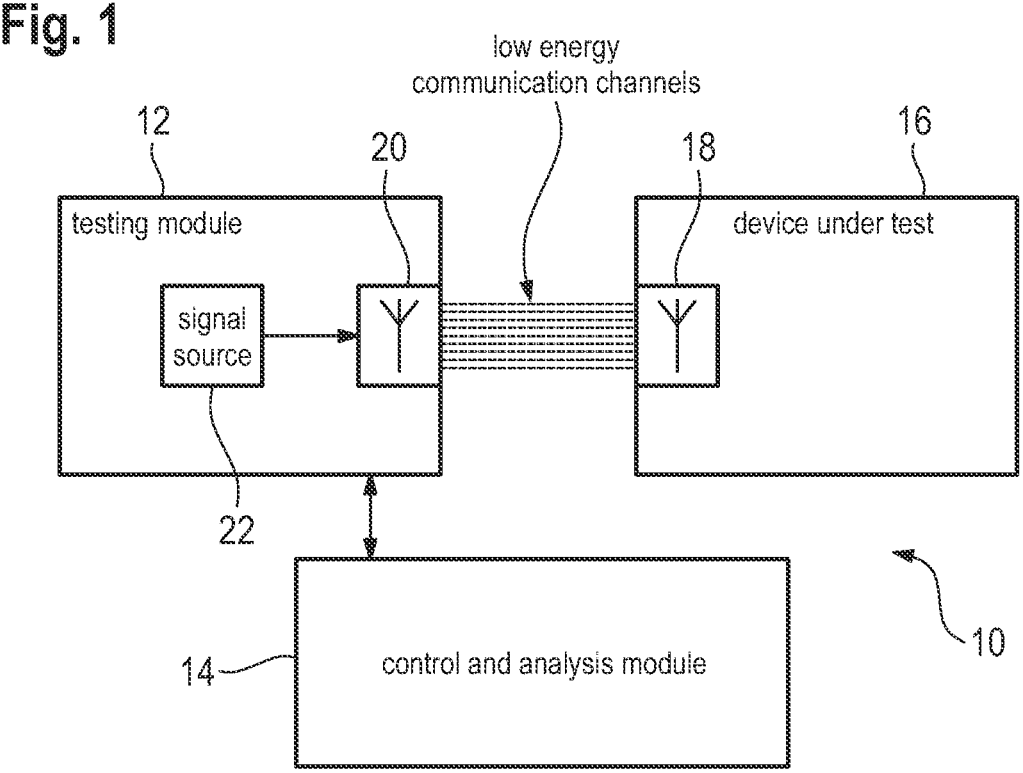
FIG. 1 schematically shows a test system according to a first embodiment of the present disclosure.

FIG. 1 shows a block diagram of a test system 10 comprising a testing module 12 comprised of one or more circuits, a control and analysis module 14 comprised of one or more circuits, and a device under test 16.

Therein and in the following, the term "module" is understood to describe suitable hardware, suitable software, or a combination of hardware and software that is configured to have a certain functionality. The hardware may, inter alia, comprise one or more circuits in the form of a CPU, a GPU, an FPGA, an ASIC, or other types of electronic circuitry or programmed processors configured to perform the recited functionality.

In general, the device under test 16 is established as an electronic device being configured to communicate with other electronic devices via a low energy wireless communication protocol. In that regard, the device under test 16 may include a communications interface comprised of one or more circuits in order to communicate with other devices according to a low energy wireless communication protocol. In some embodiments, the device under test 16 is configured to communicate with other electronic devices via Bluetooth Low Energy, which is also called Bluetooth Smart.

Accordingly, the device under test 16 comprises an RF circuit or module 18 being configured to receive and transmit electromagnetic waves at least in a predetermined frequency band, for example in a frequency band defined by the Bluetooth Low Energy protocol.

The testing module 12 is established as a testing device for testing low energy communication properties of the device under test 16. In some embodiments, the testing module 12 is established as a testing device for testing Bluetooth Low Energy communication properties of the device under test 16.

The testing module 12 comprises an RF circuit or module 20 being configured to receive and transmit electromagnetic waves at least in the same predetermined frequency band as the device under test 16. The testing module 12 further comprises a signal source 22 being configured to generate an RF output signal. The signal source 22 is connected to the RF module 20 in a signal transmitting manner, such that the RF output signal generated by the signal source 22 can be transmitted to the device under test 16 via the RF module 20.

Therein and in the following, the term "connected in a signal transmitting manner" is understood to denote a cablebased or wireless connection that is configured to transmit signals between the respective devices or components.

In general, the control and analysis module 14 is configured to control the testing module 12 or rather the signal source 22 to generate an RF output signal with predetermined properties. The control and analysis module 14 is further configured to receive and analyze measurement data from the testing module that is associated with a performance of the device under test 16. For example, the control and analysis module 14 may be established as a computer, as a laptop, or as any other type of smart device having suitable software.

Figure 2:
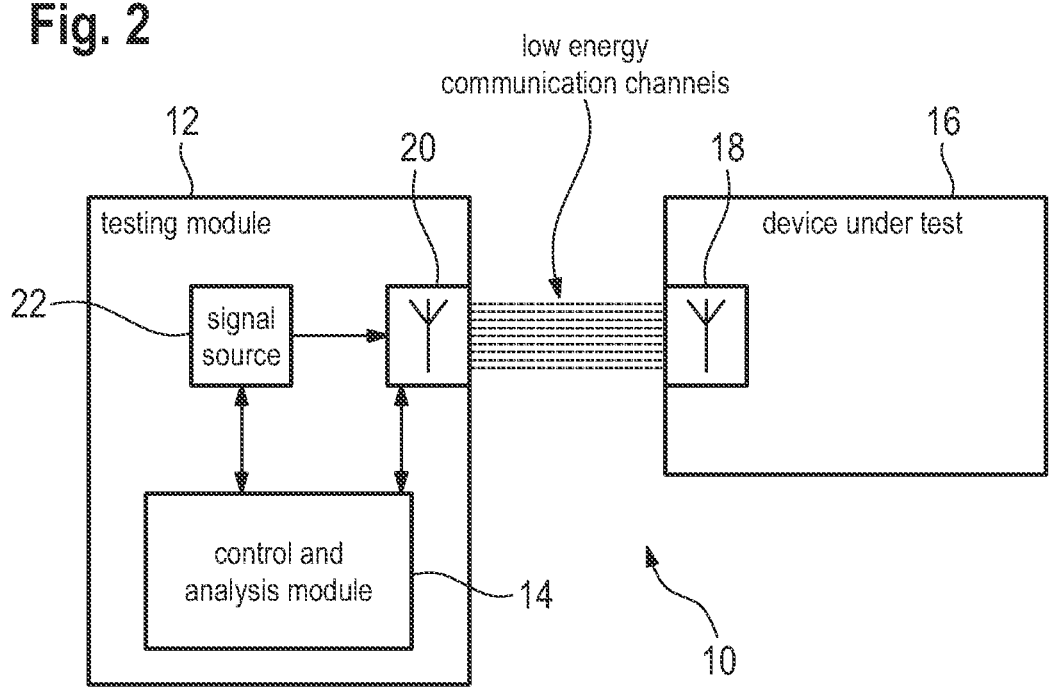
FIG. 2 schematically shows a test system according to a second embodiment of the present disclosure.

It is noted that while the control and analysis module 14 is established separately from the testing module 12 in the embodiment of the test system 10 shown in FIG. 1, the control and analysis module 14 may also be integrated into the testing module 12, as is shown in FIG. 2.

Generally speaking, the testing module 12 and the control and analysis module 14 are configured to test the device under test 16 via the low energy communication protocol employed by the device under test 16, for example via Bluetooth Low Energy. More precisely, the test system 10 is configured to perform a testing method for testing the device under test 16 that is described in the following with reference to FIG. 3.

A wireless connection being based on a low energy communication protocol is established between the testing module 12 and the device under test 16 (step S1).

The wireless connection comprises a communication channel and at least one test channel, which are collectively denoted as "low energy communication channels" in FIGS. 1 and 2.

Therein, an RF level of the control channel is higher than an RF level of the at least one test channel, such that the wireless connection between the testing module 12 and the device under test 16 can be reliably established.

The control channel is associated with control messages that are used in order to establish the wireless connection between the testing module 12 and the device under test 16, and/or in order to command the device under test 16 to enter a certain operational mode.

If the low energy communication protocol is Bluetooth Low Energy, the control channel may be established as at least one of the three advertising channels according to the Bluetooth Low Energy protocol.

The control and analysis module 14 may control the testing module 12 to generate a control message comprising instructions for the device under test 16 in order to establish the wireless connection. The control message is transmitted to the device under test 16 via the control channel. Moreover, the control message may comprise instructions for the device under test 16 to enter a certain operational mode, for example a receiver mode (also called RX mode).

Without restriction of generality, a receiver mode of the device under test 16 is described in the following.

The at least one test channel is associated with data packages that are transmitted between the testing module 12 and the device under test 16, or more precisely from the testing module 12 to the device under test 16.

If the low energy communication protocol is Bluetooth Low Energy, then the at least one test channel may be established as a data channel according to the Bluetooth Low Energy protocol.

A packet error rate (PER) test is conducted via the at least one test channel by the testing module 12 (step S2). As is illustrated in FIG. 4, the PER test is conducted at a first RF level of the at least one test channel, which is lower than an RF level of the control channel.

In some embodiments, the signal level of the data packages transmitted via the test channel is lower than the signal level of a control message sent by the testing module 12, and also lower than the signal level of a control message sent by the device under test 16.

Figure 4:
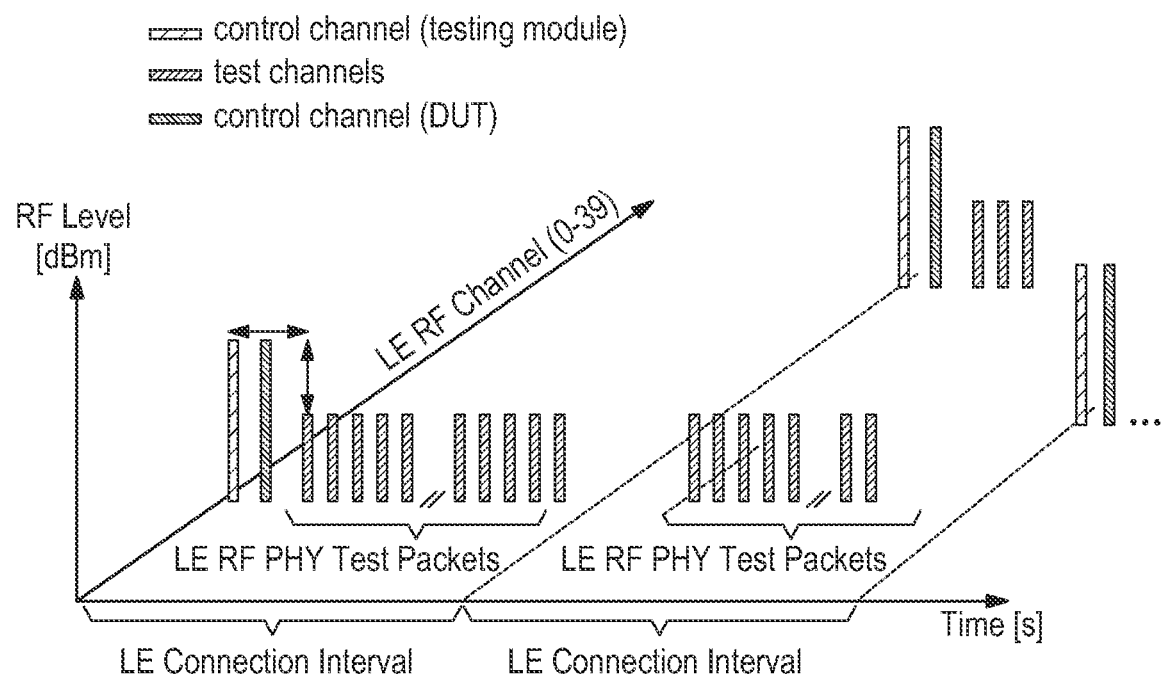
FIG. 4 shows a schematic diagram of an RF level of several RF channels plotted against time.

In general, the PER corresponds to the number of data packages that are not successfully received by the device under test 16 divided by the total number of data packages sent to the device under test 16 (denoted as "LE RF PHY Test Packets" in FIG. 4). Thus, the PER constitutes a measure for the reliability of the wireless connection between the testing module 12 and the device under test 16 at the current RF level of the at least one test channel.

The PER test may be performed as described in the following: The testing module 12 or rather the signal source 22 generates an RF output signal comprising the data packages and transmits the RF output signal to the device under test 16 via the at least one test channel.

The device under test 16 receives the data packages and counts the correctly received data packages.

The device under test 16 test feeds back the number of successfully received data packages to the testing module 12 via the at least one test channel or via the control channel.

The control and analysis module 14 determines the PER of the device under test 16 at the first RF level of the at least one test channel.

The control and analysis module 14 compares the determined PER with an error threshold for the device under test 16 in order to determine whether the device under test 16 has passed the PER test at the first RF level of the at least one test channel.

The error threshold is associated with a maximal allowable PER for the device under test 16. The maximal allowable PER may be dependent on a payload length of the data packages, i.e. on a number of symbols comprised in each data package, for example dependent on a number of bits comprised in each data package.

For example, the maximal allowable PER may be between 10% and 35%, for example between 20% and 30%.

The PER test described above may be performed for all test channels (denotes as "LE RF Channels (0-39)" in FIG. 4) simultaneously and/or consecutively.

If the device under test 16 has passed the PER test at the first RF level of the at least one test channel, the RF level is adapted to a second RF level (step S3).

More precisely, the second RF level of the at least one test channel is lower than the first RF level of the at least one test channel if the device under test 16 has passed the previous PER test.

If the device under test 16 has failed the previous PER test, the second RF level may be higher than the first RF level.

Without restriction of generality, the case is described in the following, in which the device under test 16 has passed the previous PER test.

Therein, the RF level of the control channel may be adapted together with the RF level of the at least one test channel, such that a difference between the RF levels of the control channel and the at least one test channel is kept constant.

Alternatively, the RF levels of the control channel and of the at least one test channel may be adapted independent from each other, such that the RF level difference between the control channel and the at least one test channel changes.

In some embodiments, the RF level of the at least one test channel may be lowered, while the RF level of the control channel is kept constant.

The PER test described above is repeated at the second RF level of the at least one test channel (step S4).

If the device under test 16 passes the PER test at the second RF level of the at least one test channel, steps S3 and S4 described above may be repeated at a third RF level of the at least one test channel.

In some embodiments, the PER test is repeated until the device under test 16 fails the PER test at a certain RF level of the at least one test channel.

If the device under test fails an PER test, the testing of the device under test 16 is stopped (step S5).

The sensitivity level of the device under test 16 may be determined based on the PER tests described above (step S6).

The sensitivity level is associated with a minimal signal level needed for a reliable data transmission between the device under test 16 and another electronic device.

Accordingly, the sensitivity level may be determined to be the lowest RF level for which the device under test 16 has passed the PER test.

With the test method described above, properties of the device under test 16 like the PER can be tested at low signal levels in a reliable manner, and without a need for a physical connection between the testing module 12 and the device under test 16.

In some embodiments, the test method described above allows for determining the sensitivity level of the device under test 16 over the air without losing the wireless connection between the testing module 12 and the device under test 16.

Figure 3:
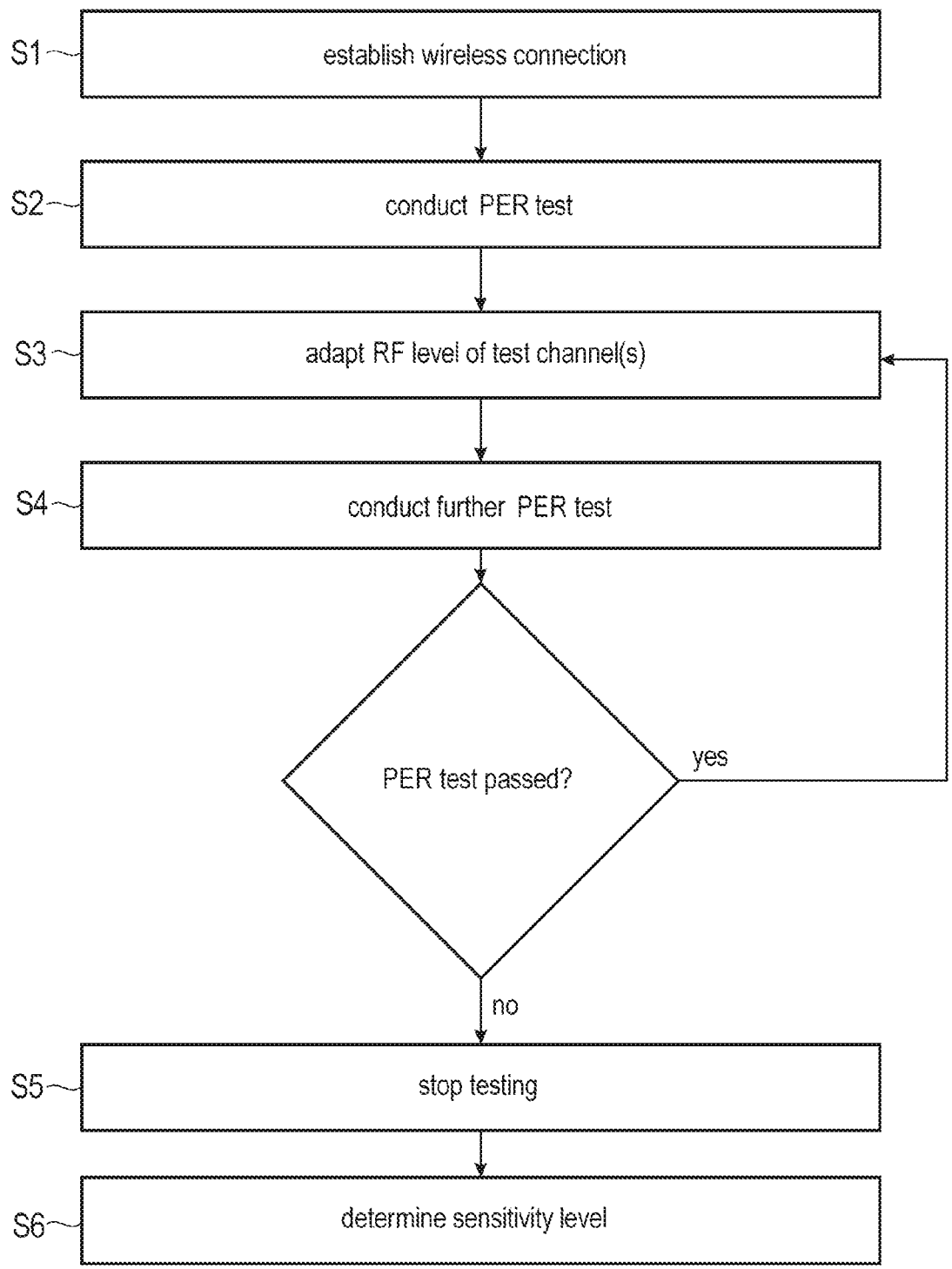
FIG. 3 shows a flow chart of a representative testing method according to an embodiment of the present disclosure.

The testing module 12 and/or the control and analysis module 14 is configured to perform one or more steps schematically shown, for example, in FIG. 3. In some embodiments, one or more of these components includes one or more computer-readable media containing computer readable instructions embodied thereon that, when executed by one or more computing device, computer circuits, etc., (contained in or associated with the test system 10 or components thereof), cause the one or more computing devices, computer circuits, etc., to perform one or more steps of the method of FIG. 3 described above. In some embodiments, the one or more computing devices, computer circuits, etc., includes a microprocessor, a microcontroller, a central processing unit, a graphics processing unit (GPU), a digital signal processor (DSP), etc.

In some embodiments, the one or more computer-readable media contains computer readable instructions embodied thereon that, when executed by the one or more computer circuits, cause the one or more computer circuits to perform one or more steps of any of the methods of claims 11-20.

As described briefly above, certain embodiments disclosed herein utilize circuitry (e.g., one or more circuits) in order to implement standards, protocols, methodologies or technologies disclosed herein, operably couple two or more components, generate information, process information, analyze information, store information, display information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices or computer circuits such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of the modules, units, etc., described above, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A test system for testing a device under test, the test system comprising a testing module and the device under test, the testing module comprising one or more circuits configured to establish a wireless connection with the device under test based on a wireless communication standard having a low energy protocol, the wireless connection comprising a control channel and at least one test channel, the control channel being configured to transmit at least one control message between the testing module and the device under test, wherein the at least one control message comprises information relevant for establishing a communication between the testing module and the device under test and/or for controlling the device under test to enter a certain operational mode, the at least one test channel being configured to transmit data packages between the testing module and the device under test, wherein the data packages are associated with information that is transmitted between the testing module and the device under test other than the at least one control message, wherein an RF level of the control channel is higher than an RF level of the at least one test channel, and wherein the testing module is configured to selectively adjust the RF level of the control channel and the RF level of the at least one test channel.

2. The test system of claim 1, wherein the wireless communication standard is associated with Bluetooth Low Energy.

3. The test system of claim 1, wherein the testing module is configured to keep an RF level difference between the control channel and the at least one test channel constant.

4. The test system of claim 1, wherein the testing module is configured to adjust an RF level difference between the control channel and the at least one test channel.

5. The test system of claim 1, wherein the testing module is configured to conduct a packet error rate (PER) test on the device under test via the wireless connection.

6. The test system of claim 5, wherein the testing module is configured to conduct the PER test for a receiver mode of the device under test.

7. The test system of claim 5, wherein the PER test comprises an error threshold being associated with a maximal allowable PER of the device under test.

8. The test system of claim 5, wherein the testing module is configured to conduct the PER test at several different RF levels of the at least one test channel.

9. The test system of claim 5, wherein the testing module is configured to conduct the PER test on several different test channels simultaneously or consecutively.

10. A test method for testing a device under test, the test method comprising:

establishing a wireless connection with the device under test based on a wireless communication standard having a low energy protocol by a testing module, wherein the wireless connection comprises a control channel and a test channel;

transmitting a control message via the control channel, wherein the control message comprises information being relevant for establishing a communication between the testing module and the device under test and/or for controlling the device under test to enter a certain operational mode; and transmitting data packages via the test channel, wherein the data packages are associated with information that is transmitted between the testing module and the device under test other than the at least one control message;

wherein an RF level of the control channel is higher than an RF level of the at least one test channel, wherein the RF level of the control channel and the RF level of the at least one test channel are selectively adjusted, and wherein an RF level difference between the control channel and the at least one test channel is kept constant.

11. The test method of claim 10, wherein the wireless communication standard is associated with Bluetooth Low Energy.

12. The test method of claim 10, wherein a packet error rate (PER) test is conducted on the device under test by the testing module via the wireless connection.

13. The test method of claim 12, wherein the PER test is conducted for a receiver mode of the device under test.

14. The test method of claim 12, wherein the PER test comprises an error threshold being associated with a maximal allowable PER of the device under test.

15. The test method of claim 12, wherein the PER test is conducted at several different RF levels of the at least one test channel.

16. The test method of claim 12, wherein the PER test is conducted on several different test channels simultaneously or consecutively.

17. A test system for testing a device under test, the test system comprising a testing module and the device under test, the testing module comprising one or more circuits configured to establish a wireless connection with the device under test based on a wireless communication standard having a low energy protocol, the wireless connection comprising a control channel and at least one test channel, the control channel being configured to transmit at least one control message between the testing module and the device under test, wherein the at least one control message comprises information being relevant for establishing a communication between the testing module and the device under test and/or for controlling the device under test to enter a certain operational mode, the at least one test channel being configured to transmit data packages between the testing module and the device under test, wherein the data packages are associated with information that is transmitted between the testing module and the device under test other than the at least one control message, wherein an RF level of the control channel is higher than an RF level of the at least one test channel, wherein the testing module is configured to selectively adjust the RF level of the control channel and the RF level of the at least one test channel, and wherein the testing module is configured to adjust an RF level difference between the control channel and the at least one test channel.

* * * * *